(12) United States Patent
Lindholm

(10) Patent No.: US 7,038,686 B1
(45) Date of Patent: May 2, 2006

(54) PROGRAMMABLE GRAPHICS PROCESSOR FOR MULTITHREADED EXECUTION OF PROGRAMS

(75) Inventor: John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/713,173

(22) Filed: Nov. 14, 2003

Related U.S. Application Data

(63) Continuation-in-part of application No. 10/609,967, filed on Jun. 30, 2003.

(51) Int. Cl.
 G06F 15/00 (2006.01)
 G06F 9/46 (2006.01)
 G06T 1/00 (2006.01)
(52) U.S. Cl. .................. 345/501; 345/522; 718/104
(58) Field of Classification Search ........ 345/501–503, 345/522, 531, 530, 543, 418, 419, 426, 427; 718/100, 103, 104
See application file for complete search history.

(56) References Cited

U.S. PATENT DOCUMENTS

| | | | | | |
|---|---|---|---|---|---|
| 5,020,115 | A | * | 5/1991 | Black | 382/298 |
| 5,969,726 | A | * | 10/1999 | Rentschler et al. | 345/506 |
| 6,630,935 | B1 | * | 10/2003 | Taylor et al. | 345/522 |
| 6,731,289 | B1 | * | 5/2004 | Peercy et al. | 345/503 |
| 2003/0041173 | A1 | * | 2/2003 | Hoyle | 709/248 |

* cited by examiner

*Primary Examiner*—Kee M. Tung
(74) *Attorney, Agent, or Firm*—Patterson & Sheridan LLP

(57) ABSTRACT

A programmable graphics processor for multithreaded execution of program instructions including a thread control unit. The programmable graphics processor is programmed with program instructions for processing primitive, pixel and vertex data. The thread control unit has a thread storage resource including locations allocated to store thread state data associated with samples of two or more types. Sample types include primitive, pixel and vertex. A number of threads allocated to processing a sample type may be dynamically modified.

20 Claims, 10 Drawing Sheets

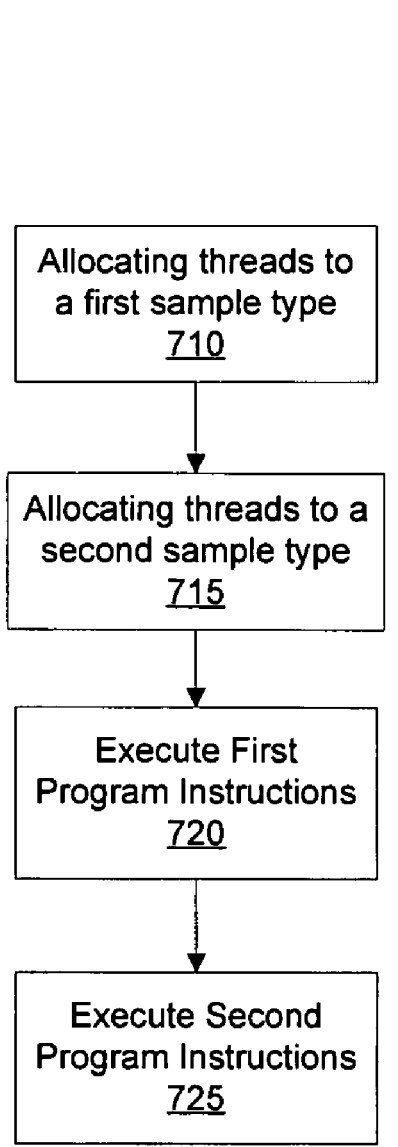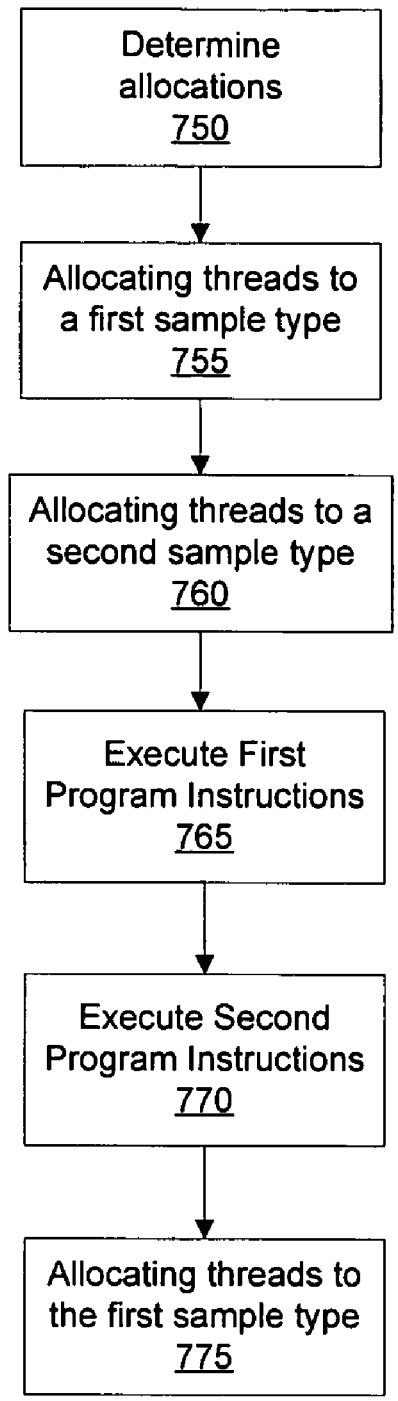
FIG. 7A
FIG. 7B

US 7,038,686 B1

PROGRAMMABLE GRAPHICS PROCESSOR FOR MULTITHREADED EXECUTION OF PROGRAMS

CROSS-REFERENCE TO RELATED APPLICATIONS

The application is a continuation-in-part of, and claims priority benefit of, co-pending U.S. patent application Ser. No. 10/609,967 entitled "A Programmable Graphics Processor for Multithreaded Execution of Programs", filed Jun. 30, 2003, having common inventor and assignee as this application. The subject matter of the related patent application is hereby incorporated by reference.

FIELD OF THE INVENTION

One or more aspects of the invention generally relate to multithreaded processing, and more particularly to processing graphics data in a programmable graphics processor.

BACKGROUND

Current graphics data processing includes systems and methods developed to perform a specific operation on graphics data, e.g., linear interpolation, tessellation, rasterization, texture mapping, depth testing, etc. These graphics processors include several fixed function computation units to perform such specific operations on specific types of graphics data, such as vertex data and pixel data. More recently, the computation units have a degree of programmability to perform user specified operations such that the vertex data is processed by a vertex processing unit using vertex programs and the pixel data is processed by a pixel processing unit using pixel programs. When the amount of vertex data being processed is low relative the amount of pixel data being processed, the vertex processing unit may be underutilized. Conversely, when the amount of vertex data being processed is high relative the amount of pixel data being processed, the pixel processing unit may be underutilized.

Accordingly, it would be desirable to provide improved approaches to processing different types of graphics data to better utilize one or more processing units within a graphics processor.

SUMMARY

A method and apparatus for processing and allocating threads for multithreaded execution of graphics programs is described. A graphics processor for multithreaded execution of program instructions associated with threads to process at least two sample types includes a thread control unit including a thread storage resource configured to store thread state data for each of the threads.

A method of multithreaded processing of graphics data includes receiving a sample, determining a type of the sample, and assigning the sample to a thread for processing.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIGS. 7A and 7B are flow diagrams of exemplary embodiments of thread allocation and processing in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
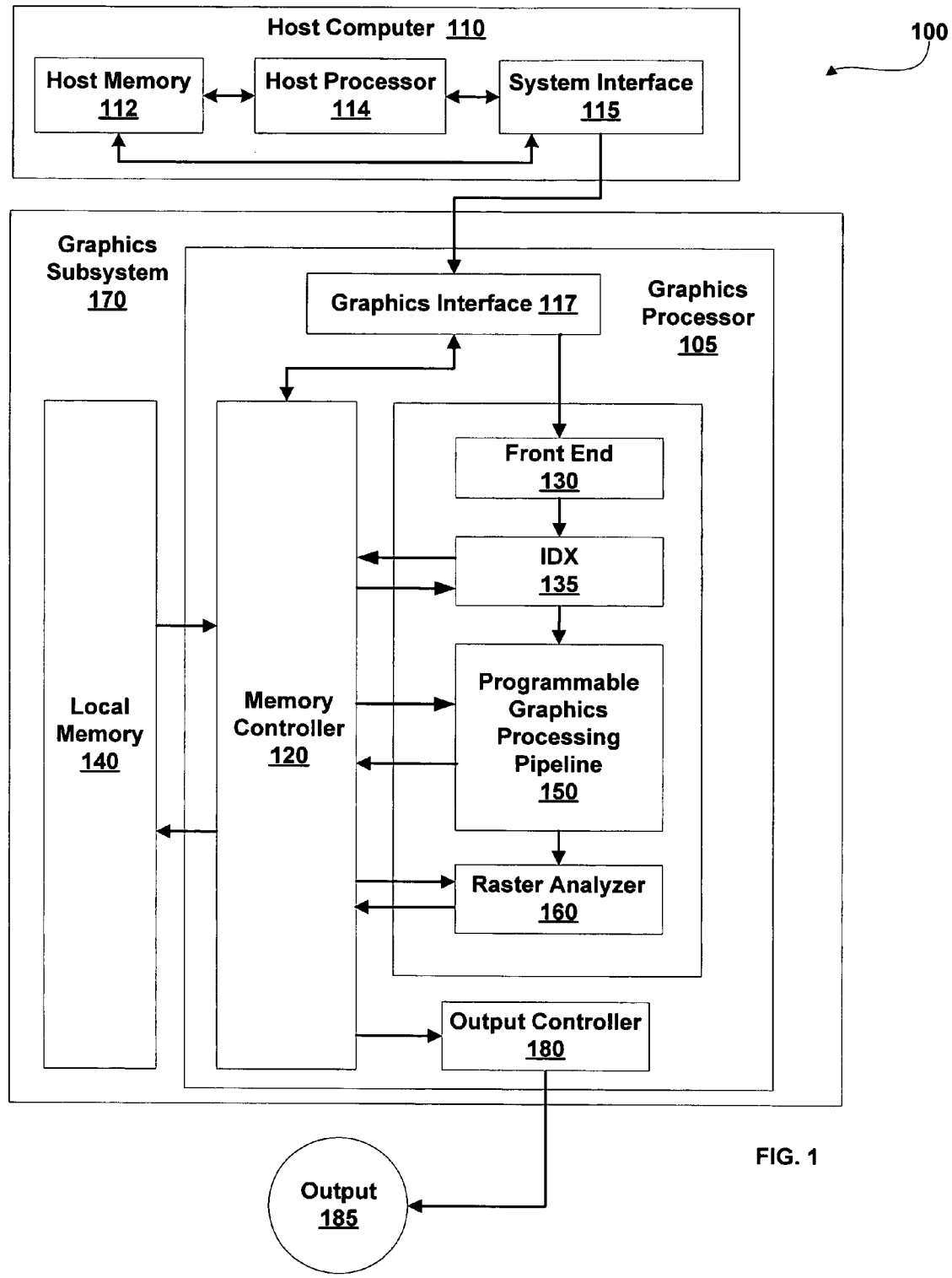
FIG. 1 illustrates one embodiment of a computing system according to the invention including a host computer and a graphics subsystem.

FIG. 1 is an illustration of a Computing System generally designated 100 and including a Host Computer 110 and a Graphics Subsystem 170. Computing System 100 may be a desktop computer, server, laptop computer, palm-sized computer, tablet computer, game console, cellular telephone, computer based simulator, or the like. Host Computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory can include portions of Host Memory 112, Local Memory 140, register files coupled to the components within Graphics Processor 105, and the like.

Graphics Processor 105 includes, among other components, Front End 130 that receives commands from Host Computer 110 via Graphics Interface 117. Front End 130 interprets and formats the commands and outputs the formatted commands and data to an IDX (Index Processor) 135. Some of the formatted commands are used by Programmable Graphics Processing Pipeline 150 to initiate processing of data by providing the location of program instructions or graphics data stored in memory. IDX 135, Programmable Graphics Processing Pipeline 150 and a Raster Analyzer 160 each include an interface to Memory Controller 120 through which program instructions and data can be read from memory, e.g., any combination of Local Memory 140 and Host Memory 112. When a portion of Host Memory 112 is used to store program instructions and data, the portion of Host Memory 112 can be uncached so as to increase performance of access by Graphics Processor 105.

IDX 135 optionally reads processed data, e.g., data written by Raster Analyzer 160, from memory and outputs the data, processed data and formatted commands to Programmable Graphics Processing Pipeline 150. Programmable Graphics Processing Pipeline 150 and Raster Analyzer 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 150 and Raster Analyzer 160 are each optionally configured such that data processing operations are performed in multiple passes through those units or in multiple passes within Programmable Graphics Processing Pipeline 150. Programmable Graphics Processing Pipeline 150 and a Raster Analyzer 160 also each include a write interface to Memory Controller 120 through which data can be written to memory.

In a typical implementation Programmable Graphics Processing Pipeline 150 performs geometry computations, rasterization, and pixel computations. Therefore Programmable Graphics Processing Pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by Programmable Graphics Processing Pipeline 150 are passed to a Raster Analyzer 160, which optionally performs near and far plane clipping and raster operations, such as stencil, z test, and the like, and saves the results or the samples output by Programmable Graphics Processing Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other Computing System 100, other Graphics Subsystem 170, or the like. Alternatively, data is output to a film recording device or written to a peripheral device, e.g., disk drive, tape, compact disk, or the like.

Figure 2:
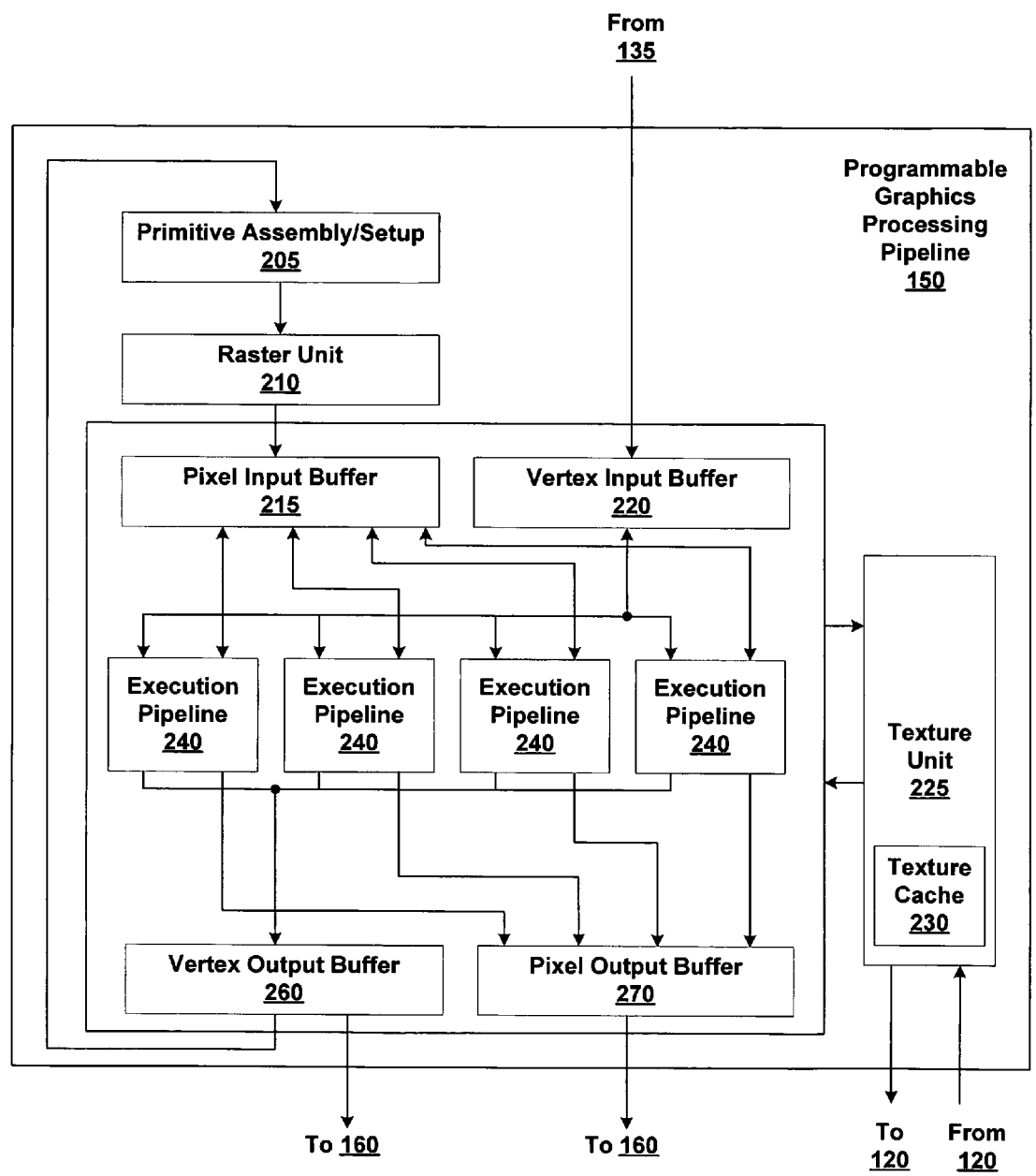
FIG. 2 is a block diagram of an embodiment of the Programmable Graphics Processing Pipeline of FIG. 1.

FIG. 2 is an illustration of Programmable Graphics Processing Pipeline 150 of FIG. 1. At least one set of samples is output by IDX 135 and received by Programmable Graphics Processing Pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by Programmable Graphics Processing Pipeline 150 and stored in a Vertex Input Buffer 220 including a register file, FIFO (first in first out), cache, or the like (not shown). The samples are broadcast to Execution Pipelines 240, four of which are shown in the figure. Each Execution Pipeline 240 includes at least one multithreaded processing unit, to be described further herein. The samples output by Vertex Input Buffer 220 can be processed by any one of the Execution Pipelines 240. A sample is accepted by an Execution Pipeline 240 when a processing thread within the Execution Pipeline 240 is available as described further herein. Each Execution Pipeline 240 signals to Vertex Input Buffer 220 when a sample can be accepted or when a sample cannot be accepted. In one embodiment Programmable Graphics Processing Pipeline 150 includes a single Execution Pipeline 240 containing one multithreaded processing unit. In an alternative embodiment, Programmable Graphics Processing Pipeline 150 includes a plurality of Execution Pipelines 240.

Execution Pipelines 240 may receive first samples, such as higher-order surface data, and tessellate the first samples to generate second samples, such as vertices. Execution Pipelines 240 may be configured to transform the second samples from an object-based coordinate representation (object space) to an alternatively based coordinate system such as world space or normalized device coordinates (NDC) space. Each Execution Pipeline 240 may communicate with Texture Unit 225 using a read interface (not shown in FIG. 2) to read program instructions and graphics data such as texture maps from Local Memory 140 or Host Memory 112 via Memory Controller 120 and a Texture Cache 230. Texture Cache 230 is used to improve memory read performance by reducing read latency. In an alternate embodiment Texture Cache 230 is omitted. In another alternate embodiment, a Texture Unit 225 is included in each Execution Pipeline 240. In another alternate embodiment program instructions are stored within Programmable Graphics Processing Pipeline 150. In another alternate embodiment each Execution Pipeline 240 has a dedicated instruction read interface to read program instructions from Local Memory 140 or Host Memory 112 via Memory Controller 120.

Execution Pipelines 240 output processed samples, such as vertices, that are stored in a Vertex Output Buffer 260 including a register file, FIFO, cache, or the like (not shown). Processed vertices output by Vertex Output Buffer 260 are received by a Primitive Assembly/Setup Unit 205. Primitive Assembly/Setup Unit 205 calculates parameters, such as deltas and slopes, to rasterize the processed vertices and outputs parameters and samples, such as vertices, to a Raster Unit 210. Raster Unit 210 performs scan conversion on samples, such as vertices, and outputs samples, such as fragments, to a Pixel Input Buffer 215. Alternatively, Raster Unit 210 resamples processed vertices and outputs additional vertices to Pixel Input Buffer 215.

Pixel Input Buffer 215 outputs the samples to each Execution Pipeline 240. Samples, such as pixels and fragments, output by Pixel Input Buffer 215 are each processed by only one of the Execution Pipelines 240. Pixel Input Buffer 215 determines which one of the Execution Pipelines 240 to output each sample to depending on an output pixel position, e.g., (x,y), associated with each sample. In this manner, each sample is output to the Execution Pipeline 240 designated to process samples associated with the output pixel position. In an alternate embodiment, each sample output by Pixel Input Buffer 215 is processed by one of any available Execution Pipelines 240.

Each Execution Pipeline 240 signals to Pixel Input Buffer 240 when a sample can be accepted or when a sample cannot be accepted as described further herein. Program instructions configure programmable computation units (PCUs) within an Execution Pipeline 240 to perform operations such as tessellation, perspective correction, texture mapping, shading, blending, and the like. Processed samples are output from each Execution Pipeline 240 to a Pixel Output Buffer 270. Pixel Output Buffer 270 optionally stores the processed samples in a register file, FIFO, cache, or the like (not shown). The processed samples are output from Pixel Output Buffer 270 to Raster Analyzer 160.

Figure 3:
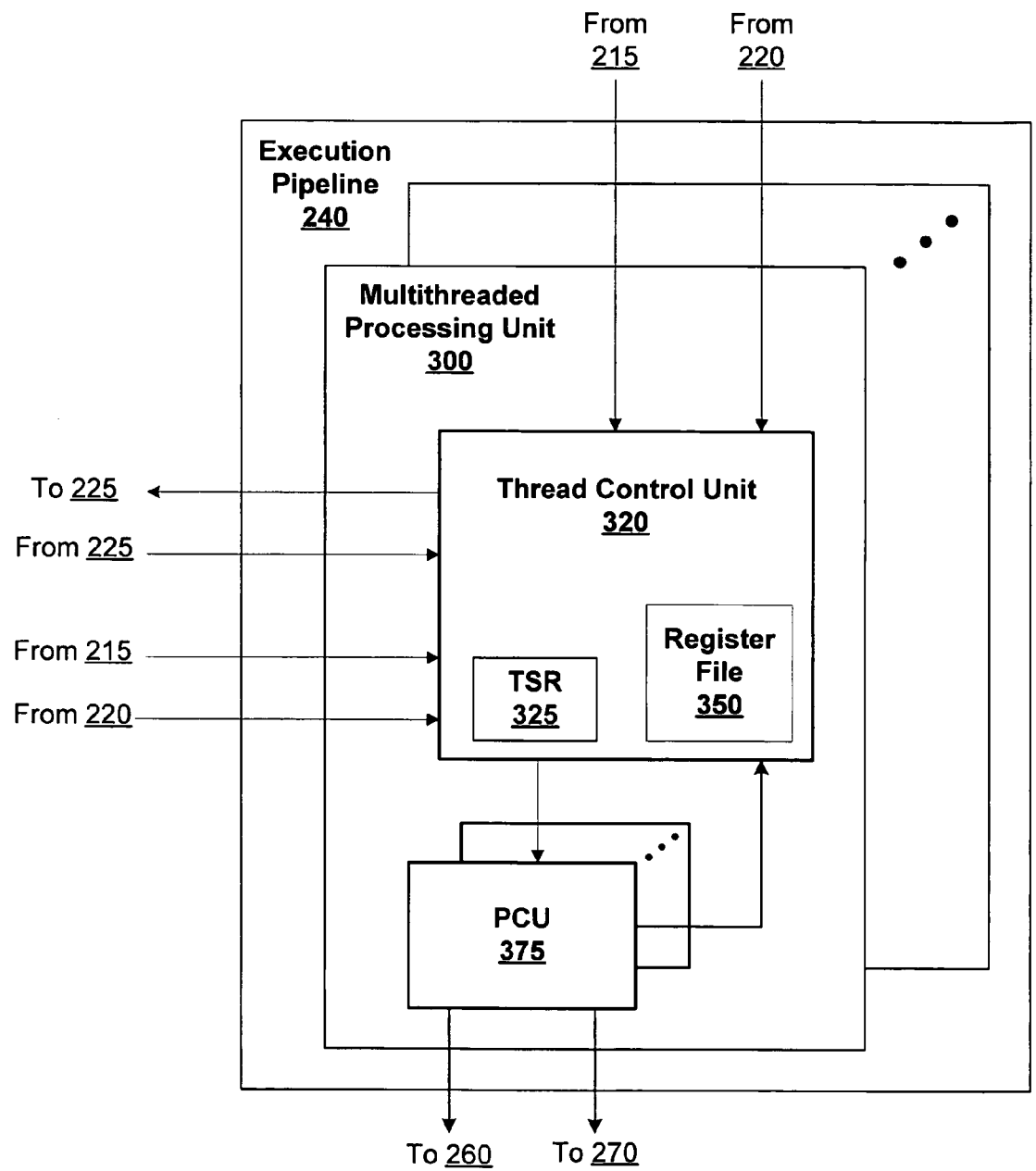
FIG. 3 is a block diagram of an embodiment of the Execution Pipeline of FIG. 1.

FIG. 3 is a block diagram of an embodiment of Execution Pipeline 240 of FIG. 1 including at least one Multithreaded Processing Unit 300. An Execution Pipeline 240 can contain a plurality of Multithreaded Processing Units 300, each Multithreaded Processing Unit 300 containing at least one PCU 375. PCUs 375 are configured using program instructions read by a Thread Control Unit 320 via Texture Unit 225. Thread Control Unit 320 gathers source data specified by the program instructions and dispatches the source data and program instructions to at least one PCU 375. PCUs 375 performs computations specified by the program instructions and outputs data to at least one destination, e.g., Pixel Output Buffer 160, Vertex Output Buffer 260 and Thread Control Unit 320.

A single program may be used to process several sets of samples. Thread Control Unit 320 receives samples or pointers to samples stored in Pixel Input Buffer 215 and Vertex Input Buffer 220. Thread Control Unit 320 receives a pointer to a program to process one or more samples. Thread Control Unit 320 assigns a thread to each sample to be processed. A thread includes a pointer to a program instruction (program counter), such as the first instruction within the program, thread state information, and storage resources for storing intermediate data generated during processing of the sample. Thread state information is stored in a TSR (Thread Storage Resource) 325. TSR 325 may be a register file, FIFO, circular buffer, or the like. An instruction specifies the location of source data needed to execute the instruction. Source data, such as intermediate data generated during processing of the sample is stored in a Register File 350. In addition to Register File 350, other source data may be stored in Pixel Input Buffer 215 or Vertex Input Buffer 220. In an alternate embodiment source data is stored in Local Memory 140, locations in Host Memory 112, and the like.

Alternatively, in an embodiment permitting multiple programs for two or more thread types, Thread Control Unit 320 also receives a program identifier specifying which one of the two or more programs the program counter is associated with. Specifically, in an embodiment permitting simultaneous execution of four programs for a thread type, two bits of thread state information are used to store the program identifier for a thread. Multithreaded execution of programs is possible because each thread may be executed independent of other threads, regardless of whether the other threads are executing the same program or a different program. PCUs 375 update each program counter associated with the threads in Thread Control Unit 320 following the execution of an instruction. For execution of a loop, call, return, or branch instruction the program counter may be updated based on the loop, call, return, or branch instruction.

For example, each fragment or group of fragments within a primitive can be processed independently from the other fragments or from the other groups of fragments within the primitive. Likewise, each vertex within a surface can be processed independently from the other vertices within the surface. For a set of samples being processed using the same program, the sequence of program instructions associated with each thread used to process each program sample within the set will be identical, although the program counter for each thread may vary. However, it is possible that, during execution, the threads processing some of the samples within a set will diverge following the execution of a conditional branch instruction. After the execution of a conditional branch instruction, the sequence of executed instructions associated with each thread processing samples within the set may differ and each program counter stored in TSR 325 within Thread Control Unit 320 for the threads may differ accordingly.

Figure 4:
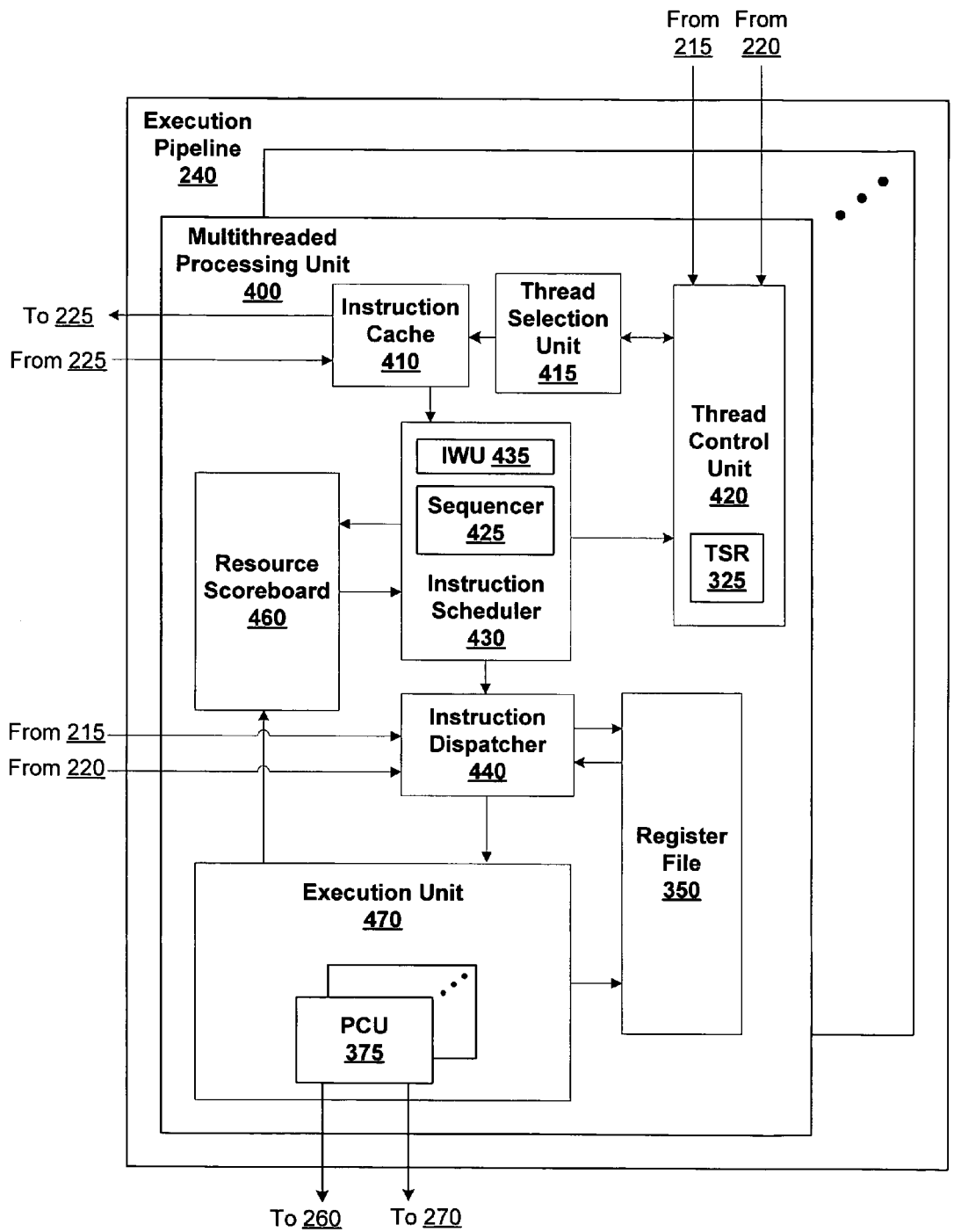
FIG. 4 is a block diagram of an alternate embodiment of the Execution Pipeline of FIG. 1.

FIG. 4 is an illustration of an alternate embodiment of Execution Pipeline 240 containing at least one Multithreaded Processing Unit 400. Thread Control Unit 420 includes a TSR 325 to retain thread state data. In one embodiment TSR 325 stores thread state data for each of at least two thread types, where the at least two thread types may include pixel, primitive, and vertex. Thread state data for a thread may include, among other things, a program counter, a busy flag that indicates if the thread is either assigned to a sample or available to be assigned to a sample, a pointer to a source sample to be processed by the instructions associated with the thread or the output pixel position and output buffer ID of the source sample to be processed, and a pointer specifying a destination location in Vertex Output Buffer 260 or Pixel Output Buffer 270. Additionally, thread state data for a thread assigned to a sample may include the sample type, e.g., pixel, vertex, primitive, or the like. The type of data a thread processes identifies the thread type, e.g., pixel, vertex, primitive, or the like. For example, a thread may process a primitive, producing a vertex. After the vertex is rasterized and fragments are generated, the thread may process a fragment.

Source samples are stored in either Pixel Input Buffer 215 or Vertex Input Buffer 220. Thread allocation priority, as described further herein, is used to assign a thread to a source sample. A thread allocation priority is specified for each sample type and Thread Control Unit 420 is configured to assign threads to samples or allocate locations in a Register File 350 based on the priority assigned to each sample type. The thread allocation priority may be fixed, programmable, or dynamic. In one embodiment the thread allocation priority may be fixed, always giving priority to allocating vertex threads and pixel threads are only allocated if vertex samples are not available for assignment to a thread.

In an alternate embodiment, Thread Control Unit 420 is configured to assign threads to source samples or allocate locations in Register File 350 using thread allocation priorities based on an amount of sample data in Pixel Input Buffer 215 and another amount of sample data in Vertex Input Buffer 220. Dynamically modifying a thread allocation priority for vertex samples based on the amount of sample data in Vertex Input Buffer 220 permits Vertex Input Buffer 220 to drain faster and fill Vertex Output Buffer 260 and Pixel Input Buffer 215 faster or drain slower and fill Vertex Output Buffer 260 and Pixel Input Buffer 215 slower. Dynamically modifying a thread allocation priority for pixel samples based on the amount of sample data in Pixel Input Buffer 215 permits Pixel Input Buffer 215 to drain faster and fill Pixel Output Buffer 270 faster or drain slower and fill Pixel Output Buffer 270 slower. In a further alternate embodiment, Thread Control Unit 420 is configured to assign threads to source samples or allocate locations in Register File 350 using thread allocation priorities based on graphics primitive size (number of pixels or fragments included in a primitive) or a number of graphics primitives in Vertex Output Buffer 260. For example a dynamically determined thread allocation priority may be determined based on a number of "pending" pixels, i.e., the number of pixels to be rasterized from the primitives in Primitive Assembly/Setup 205 and in Vertex Output Buffer 260. Specifically, the thread allocation priority may be tuned such that the number of pending pixels produced by processing vertex threads is adequate to achieve maximum utilization of the computation resources in Execution Pipelines 240 processing pixel threads.

Once a thread is assigned to a source sample, the thread is allocated storage resources such as locations in a Register File 350 to retain intermediate data generated during execution of program instructions associated with the thread. Alternatively, source data is stored in storage resources including Local Memory 140, locations in Host Memory 112, and the like.

A Thread Selection Unit 415 reads one or more thread entries, each containing thread state data, from Thread Control Unit 420. Thread Selection Unit 415 may read thread entries to process a group of samples. For example, in one embodiment a group of samples, e.g., a number of vertices defining a primitive, four adjacent fragments arranged in a square, or the like, are processed simultaneously. In the one embodiment computed values such as derivatives are shared within the group of samples thereby reducing the number of computations needed to process the group of samples compared with processing the group of samples without sharing the computed values.

In Multithreaded Processing Unit 400, a thread execution priority is specified for each thread type and Thread Selection Unit 415 is configured to read thread entries based on the thread execution priority assigned to each thread type. A Thread execution priority may be fixed, programmable, or dynamic. In one embodiment the thread execution priority may be fixed, always giving priority to execution of vertex threads and pixel threads are only executed if vertex threads are not available for execution.

In another embodiment, Thread Selection Unit 415 is configured to read thread entries based on the amount of sample data in Pixel Input Buffer 215 and the amount of sample data in Vertex Input Buffer 220. In a further alternate embodiment, Thread Selection Unit 415 is configured to read thread entries using on a priority based on graphics primitive size (number of pixels or fragments included in a primitive) or a number of graphics primitives in Vertex Output Buffer 260. For example a dynamically determined thread execution priority is determined based on a number of "pending" pixels, i.e., the number of pixels to be rasterized from the primitives in Primitive Assembly/Setup 205 and in Vertex Output Buffer 260. Specifically, the thread execution priority may be tuned such that the number of pending pixels produced by processing vertex threads is adequate to achieve maximum utilization of the computation resources in Execution Pipelines 240 processing pixel threads.

Thread Selection Unit 415 reads one or more thread entries based on thread execution priorities and outputs selected thread entries to Instruction Cache 410. Instruction Cache 410 determines if the program instructions corresponding to the program counters and sample type included in the thread state data for each thread entry are available in Instruction Cache 410. When a requested program instruction is not available in Instruction Cache 410 it is read (possibly along with other program instructions stored in adjacent memory locations) from graphics memory. A base address, corresponding to the graphics memory location where a first instruction in a program is stored, may be used in conjunction with a program counter to determine the location in graphics memory where a program instruction corresponding to the program counter is stored. In an alternate embodiment, Instruction Cache 410 can be shared between Multithreaded Processing Units 400 within Execution Pipeline 240.

The program instructions corresponding to the program counters from the one or more thread entries are output by Instruction Cache 410 to a scheduler, Instruction Scheduler 430. The number of instructions output each clock cycle from Instruction Cache 410 to Instruction Scheduler 430 can vary depending on whether or not the instructions are available in the cache. The number of instructions that can be output each clock cycle from Instruction Cache 410 to Instruction Scheduler 430 may also vary between different embodiments. In one embodiment, Instruction Cache 410 outputs one instruction per clock cycle to Instruction Scheduler 430. In an alternate embodiment, Instruction Cache 410 outputs a predetermined number of instructions per clock cycle to Instruction Scheduler 430.

Instruction Scheduler 430 contains storage resources to store a predetermined number of instructions in an IWU (instruction window unit) 435. Each clock cycle, Instruction Scheduler 430 evaluates whether any instruction within the IWU 435 can be executed based on the availability of computation resources in an Execution Unit 470 and source data stored in Register File 350. An instruction specifies the location of source data needed to execute the instruction. In addition to Register File 350, other locations of source data include Pixel Input Buffer 215, Vertex Input Buffer 220, locations in Local Memory 140, locations in Host Memory 112, and the like. A resource tracking unit, Resource Scoreboard 460, tracks the status of source data stored in registers in Register File 350. Specifically, registers scheduled to be written during processing, i.e., destination registers, are marked as "write pending". When a destination register is written, its status is updated and the "write pending" mark is removed. In one embodiment a destination register is marked as "write pending" by setting a bit in Resource Scoreboard 460 corresponding to the destination register. The bit is cleared when the destination register is written, indicating that data stored in the register is available to be used as source data. Similarly, Resource Scoreboard 460 may also track the availability of the computation resources in an Execution Unit 470.

When Instruction Scheduler 430 determines which instructions and associated threads will be executed, Instruction Scheduler 430 processes loop, call, return, or branch instructions using Sequencer 425. Sequencer 425 determines a program counter associated with a thread executing a loop, call, return, or branch instruction. For example, execution of a branch instruction may result in a program counter changing to a different value, either earlier or later in the program when the branch is taken. Instruction Scheduler 430 outputs an updated program counter to Thread Control Unit 420. Alternatively, Instruction Scheduler 430 outputs a difference value to update the program counter in Thread Control Unit 420.

For execution of other instructions (not loop call, return, or branch instructions) Instruction Scheduler 430 updates destination register status and computation resource availability in Resource Scoreboard 460 as needed, and increments each program counter in Thread Control Unit 420 associated with a thread output to Instruction Dispatcher 440 to point to the next instruction in the thread. In this manner, Instruction Scheduler 430 is able to schedule the execution of the instructions associated with each thread such that the processing of a sample is one or more instructions ahead of the processing of another sample. As a result of Instruction Scheduler 430 not being constrained to schedule instructions for execution on each sample within a set of data synchronously, the program counter for each thread may vary from program counters for other threads.

Instruction Dispatcher 440 gathers the source data from Pixel Input Buffer 215, Vertex Input Buffer 220 or Register File 350 specified in an instruction and outputs the instruction and source data to Execution Unit 470 including at least one PCU 375. Alternatively, Instruction Dispatcher 440 also gathers the source data from Local Memory 140, Host Memory 112, or the like. Execution Unit 470 is configured by the program instruction to simultaneously process samples using PCUs 375 to perform operations such as linear interpolation, derivative calculation, blending, and the like, and output the processed sample to a destination specified by the instruction. The destination may be Vertex Output Buffer 260, Pixel Output Buffer 270, or Register File 350. Alternatively, the destination may also include Local Memory 140, Host Memory 112, or the like. Execution Unit 470 can simultaneously process samples of different types, and, likewise, execute threads of different types.

When execution of an instruction is complete, Execution Unit 470 updates Resource Scoreboard 460 to indicate that destination registers are written and the computation resources used to process the instruction are available. In an alternate embodiment, Resource Scoreboard 460 snoops an interface between Execution Unit 470 and Register File 350 to update register status.

When the program instructions associated with a thread have completed execution, the storage resources allocated to retain intermediate data generated during execution of the thread become available for allocation to another thread, i.e., the storage resources are deallocated and the thread is flagged as available in Thread Control Unit 420. When a program instruction stored in Instruction Cache 410 has completed execution on each sample within the one or more sets that the program instruction is programmed to process, the program instruction is retired from Instruction Cache 410 (by being overwritten).

Figure 5A:
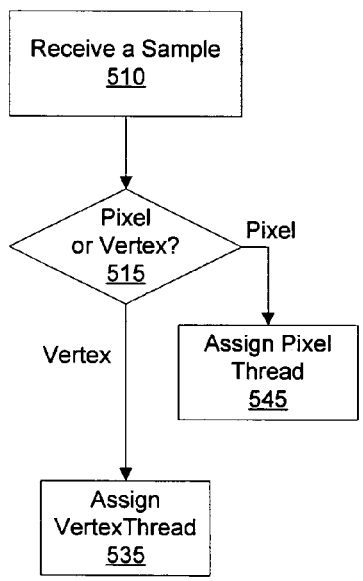
FIGS. 5A, 5B, 5C and 5D are flow diagrams of exemplary embodiments of thread assignment in accordance with one or more aspects of the present invention.

FIG. 5A is a flow diagram of an exemplary embodiment of thread processing in accordance with one or more aspects of the present invention. In step 510 Thread Control Unit 320 or 420 receives a sample, e.g., vertex, fragment, pixel, and the like. In step 515 Thread Control Unit 320 or 420 determines if the sample is a vertex sample or a pixel sample, and if the sample is a vertex sample Thread Control Unit 320 or 420 proceeds to step 530. In step 530 Thread Control Unit 320 or 420 assigns a vertex thread to the vertex sample to be processed by a vertex program.

If, in step 515 Thread Control Unit 320 or 420 determines the sample is a pixel or fragment sample, in step 545 Thread Control Unit 320 or 420 assigns a pixel thread the pixel or fragment sample to be processed by a pixel program.

Figure 5B:
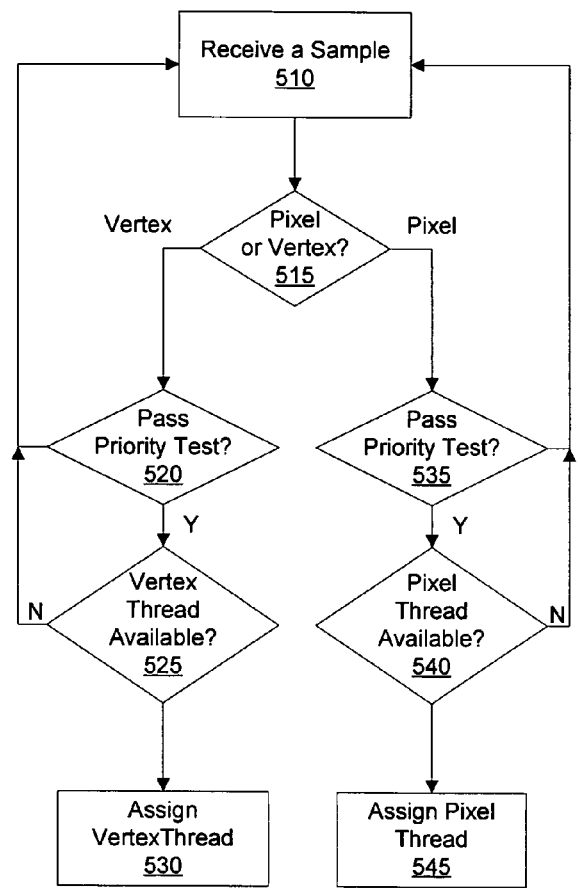

FIG. 5B is a flow diagram of another exemplary embodiment of thread processing in accordance with one or more aspects of the present invention including the steps shown in FIG. 5A. In step 510 Thread Control Unit 320 or 420 receives a sample. In step 515 Thread Control Unit 320 or 420 determines if the sample is a vertex sample or a pixel sample, and if the sample is a vertex sample Thread Control Unit 320 or 420 proceeds to step 520. In step 520 Thread Control Unit 320 or 420 uses a thread allocation priority to determine if a vertex thread may be allocated. If a vertex thread may not be allocated based on the thread allocation priority, Thread Control Unit 320 or 420 returns to step 510. If, in step 520 a vertex thread may be allocated based on the thread allocation priority, in step 525 Thread Control Unit 320 or 420 determines if a vertex thread is available for assignment. If, in step 525 Thread Control Unit 320 or 420 determines a vertex thread is not available, Thread Control Unit 320 or 420 returns to step 510. If, in step 525 Thread Control Unit 320 or 420 determines a vertex thread is available, in step 530 Thread Control Unit 320 or 420 assigns a vertex thread to the vertex sample to be processed by a vertex program.

If, in step 515 Thread Control Unit 320 or 420 determines the sample is a pixel sample, in step 535 Thread Control Unit 320 or 420 uses a thread allocation priority to determine if a pixel thread may be allocated. If a pixel thread may not be allocated based on the thread allocation priority, Thread Control Unit 320 or 420 returns to step 510. If, in step 535 a pixel thread may be allocated based on the thread allocation priority, in step 540 Thread Control Unit 320 or 420 determines if a pixel thread is available for assignment. If, in step 525 Thread Control Unit 320 or 420 determines a pixel thread is not available, Thread Control Unit 320 or 420 returns to step 510. If, in step 540 Thread Control Unit 320 or 420 determines a pixel thread is available, in step 545 Thread Control Unit 320 or 420 assigns a pixel thread to a pixel or fragment sample to be processed by a pixel program.

Figure 5C:
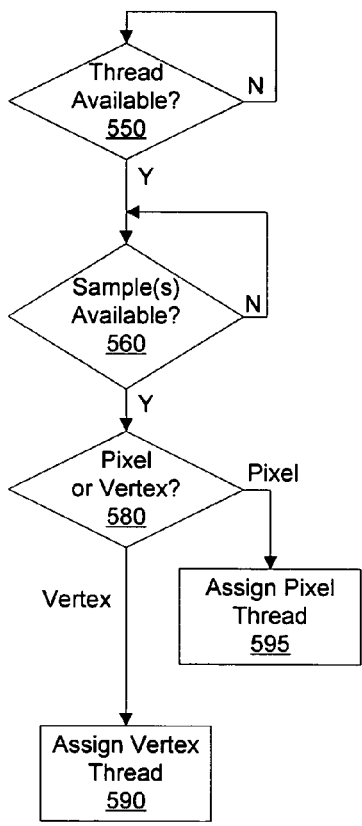

FIG. 5C is a flow diagram of an exemplary embodiment of thread processing in accordance with one or more aspects of the present invention. In step 550 Thread Control Unit 320 or 420 determines if a thread is available for assignment to a sample, and, if not, Thread Control Unit 320 or 420 remains in step 550. In one embodiment of Thread Control Unit 320 or 420 when a thread is not available for assignment to a sample, Thread Control Unit 320 or 420 does not accept additional samples from Pixel Input Buffer 215 or Vertex Input Buffer 220.

In another embodiment of Thread Control Unit 320 or 420 a storage element, e.g., register, within Thread Control Unit 320 or 420 includes at least one "slot" per sample type. Each slot stores a sample to be assigned to an available thread. In that embodiment, when a thread is not available for assignment to a sample, Thread Control Unit 320 or 420 will accept an additional sample from Pixel Input Buffer 215 if the slot for storing a pixel sample is empty. Likewise, Thread Control Unit 320 or 420 will accept an additional sample from Vertex Input Buffer 220 if the slot for storing a vertex sample is empty.

If, in step 550 Thread Control Unit 320 or 420 determines a thread is available for assignment to a sample, in step 560 Thread Control Unit 320 or 420 determines if at least one sample, e.g., vertex, primitive, fragment, pixel, and the like, is available to be processed and, if not, Thread Control Unit 320 or 420 remains in step 560. If, in step 520 Thread Control Unit 320 or 420 determines at least one sample to be assigned to an available thread, in step 580 Thread Control Unit 320 or 420 determines if the sample is a vertex or a pixel type, and if the sample is a vertex type Thread Control Unit 320 or 420 proceeds to step 590. In step 580 Thread Control Unit 320 or 420 assigns a vertex thread to a vertex type sample. If, in step 580 Thread Control Unit 320 or 420 determines the sample is a pixel type, in step 595 Thread Control Unit 320 or 420 assigns a pixel thread to a pixel or fragment to be processed by the program instruction. In an alternate embodiment Thread Control Unit 320 or 420 determines if the sample type is a primitive or other sample type and a step is included to assign a primitive or other type thread.

Figure 5D:
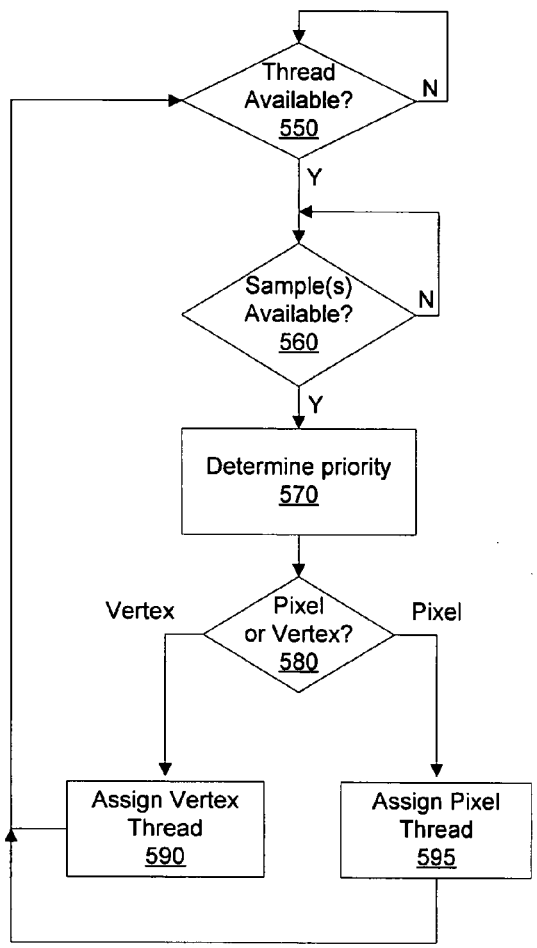

FIG. 5D is a flow diagram of another exemplary embodiment of thread processing in accordance with one or more aspects of the present invention including the steps shown in FIG. 5A. Steps 550 and 560 are completed as described in relation to FIG. 5C. If, in step 560 Thread Control Unit 320 or 420 determines at least one sample to be assigned to an available thread, in step 570 Thread Control Unit 320 or 420 uses a thread allocation priority to determine which one of the at least one samples to assign to an available thread. In an alternate embodiment the sample type that has remained in a slot the longest, i.e., the oldest sample type, is selected for assignment to an available thread. Steps 580 and step 590 or step 595 are completed as described in relation to FIG. 5C. In an alternate embodiment Thread Control Unit 320 or 420 determines if the sample type is a primitive or other sample type and additional steps are included to assign a primitive or other type thread.

Following assignment of a vertex thread, Thread Control Unit 320 dispatches vertex program instructions and source data to PCUs 375 for processing and processed vertex data is output by PCUs 375 to Vertex Output Buffer 260. Thread Control Unit 420 provides pointers to vertex program instructions to Instruction Cache 410 and processed vertex data is output by Execution Unit 470 to Vertex Output Buffer 260. In an embodiment, the processed vertex data is rasterized by Primitive Assembly/Setup Unit 205 and Raster Unit 210 to produce second graphics data, e.g., pixels or fragments. Primitive Assembly/Setup Unit 205 and Raster Unit 210 effectively convert data of a first sample type into data of a second sample type.

After assigning threads to pixels or fragments to be processed by a pixel program, Thread Control Unit 320 dispatches pixel program instructions and source data to PCUs 375 for processing. Likewise, Thread Control Unit 420 provides pointers to pixel program instructions to Instruction Cache 410. Instruction Cache 410 reads the thread state data for the thread from Thread Control Unit 420 and outputs program instructions to Instruction Scheduler 430. Instruction Scheduler 430 determines resources for processing the program instructions are available and outputs the program instructions to Instruction Dispatcher 440. Instruction Dispatcher 440 gathers any source data specified by the instructions and dispatches the source data and the instructions to Execution Unit 470 for execution.

Figure 6A:
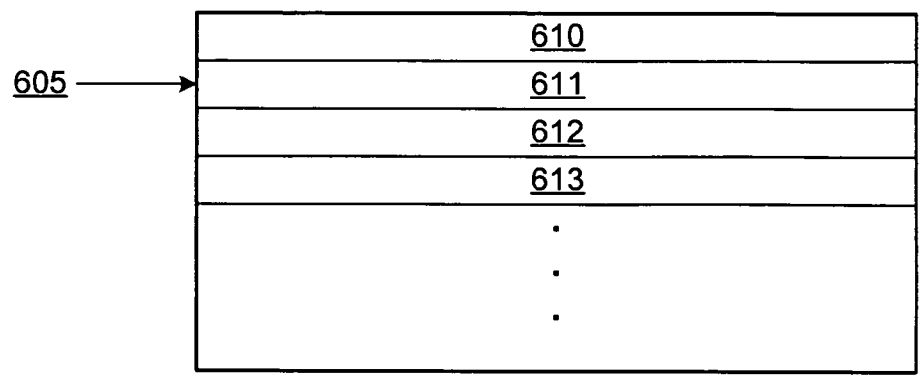
FIGS. 6A and 6B are exemplary embodiments of a portion of the Thread Storage Resource storing thread state data within an embodiment of the Thread Control Unit of FIG. 3 or FIG. 4.

FIG. 6A is an exemplary embodiment of a portion of TSR 325 storing thread state data within an embodiment of the Thread Control Unit 320 or 420. Locations 610, 611, 612, 613 within the portion of TSR 325 may each store thread state data such as, a sample type, a program counter, a busy flag, a source sample pointer, a destination pointer, and the like. A Thread Pointer 605 indicates the next thread to be processed. In this embodiment each location may store thread state data of any sample type, therefore the thread state data for each sample type may be interleaved location by location within TSR 325. Thread Control Unit 320 or 420 uses the thread state data to determine how many threads are available for allocation and how many threads are assigned to each sample type. Thread Pointer 605 is updated after one or more threads are selected for processing. In one embodiment Thread Pointer 605 is updated, skipping over unassigned, i.e., available threads. In another embodiment Thread Pointer 605 is updated, skipping over unassigned and lower priority threads based on a thread execution priority specified for each thread type. A thread execution priority may be fixed, programmable, or dynamic as previously described.

Figure 6B:
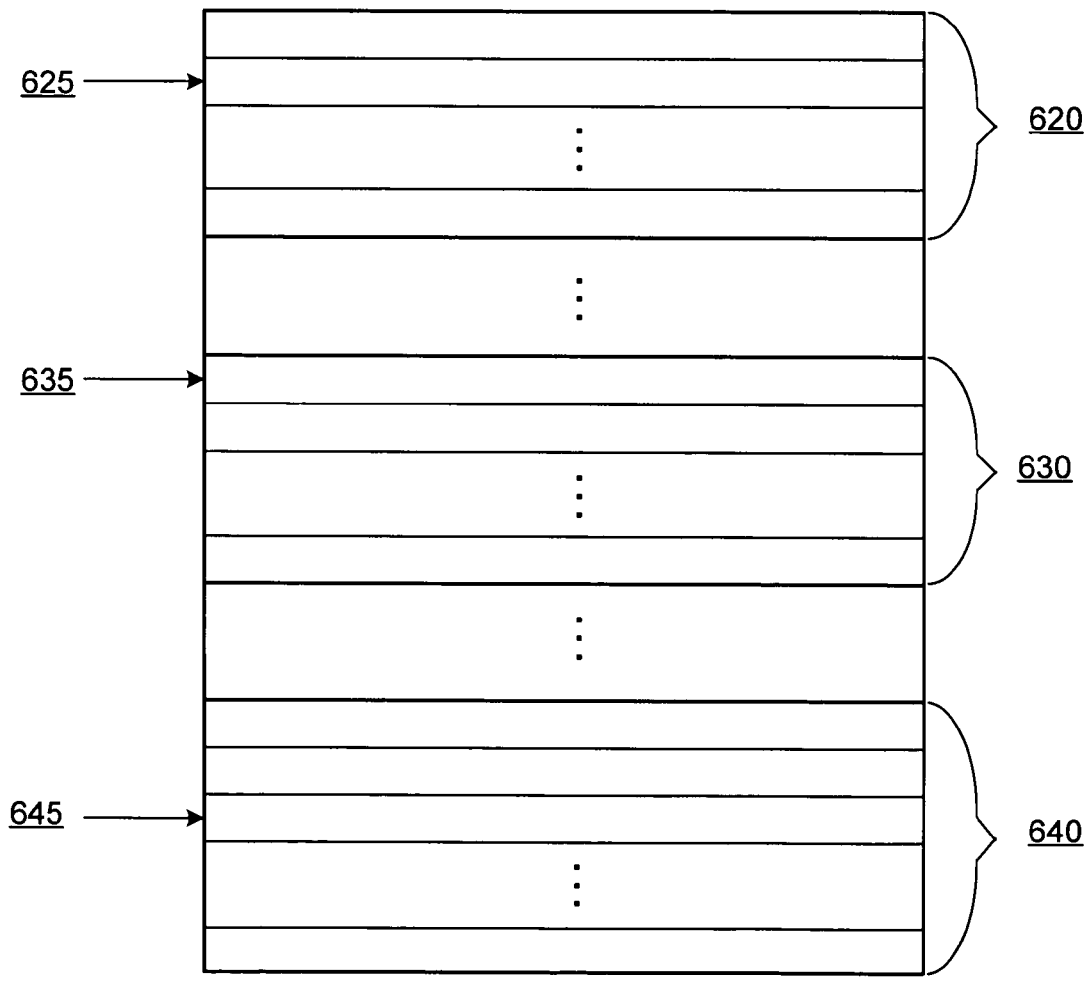

FIG. 6B is an alternate exemplary embodiment of portions of TSR 325 storing thread state data within an embodiment of the Thread Control Unit 320 or 420. Locations within the portions of TSR 325 may each store thread state data such as, a program counter, a busy flag, a source sample pointer, a destination pointer, and the like. Portion 620 includes locations allocated for storing thread state data for a first sample type. Portion 630 includes locations allocated for storing thread state data for a second sample type. Portion 640 includes locations allocated for storing thread state data for a third sample type. A sample type for each location within the portions of TSR 325 is implicit because the sample type is specified for the Portion 620, 630, and 640 containing the location. Thread Control Unit 320 or 420 uses the thread state data to determine how many threads of each sample type are available and how many threads are assigned to each sample type. Thread Pointer 625 indicates the next thread of the first sample type to be processed. Thread Pointer 635 indicates the next thread of the second sample type to be processed. Thread Pointer 645 indicates the next thread of the third sample type to be processed. Thread Pointers 625, 635 and 645 are updated as needed after one or more threads are selected for processing. Threads may be selected for processing based on thread execution priority. In one embodiment Thread Pointers 625, 635 and 645 are updated, skipping over unassigned, i.e., available threads.

The maximum size of each Portion 620, 630 and 640 may vary between different embodiments. In one embodiment, the maximum size of each Portion 620, 630 and 640 may be a fixed value. In an alternate embodiment, the maximum size of each Portion 620, 630 and 640 may be determined using a sample portion global state value. For example, the sample portion global state value specifies a maximum portion size for a sample type and the maximum portion size is stored in a register accessible by Thread Control Unit 320 or 420. The sample portion global state value may be programmed in one embodiment and fixed in another embodiment. Alternatively, the sample portion global state value may be dynamically determined based on graphics primitive size (number of pixels or fragments included in a primitive), a number of graphics primitives in Vertex Input Buffer 220, a number of memory accesses required by a program, a number of program instructions within the program, or the like.

The maximum number of threads that can be executed simultaneously is related to the number of Execution Pipelines 240, the size of storage for thread state data, the amount of storage for intermediate data generated during processing of a sample, the latency of Execution Pipelines 240, and the like. Likewise, a number of threads of each sample type that may be executed simultaneously may be limited in each embodiment. Therefore, not all samples within a first set of samples of a first type can be processed simultaneously when the number of threads available for processing samples of the first type is less than the number of samples of the first type. Conversely, when the number of threads available for processing samples of a second type exceeds the number of samples of the second type within a second set, more than one set can be processed simultaneously. When processing throughput is limited for samples of the first type, the number of threads available for the first type may be increased by allocating unused threads for processing samples of the first type. For example, locations in Portion 620 may be allocated to Portion 630.

FIG. 7A is a flow diagram of an exemplary embodiment of thread allocation and processing in accordance with one or more aspects of the present invention. In step 710 a number of threads are allocated for a first sample type and a maximum portion of TSR 325 allocated for threads to process the first type is set. The number of threads allocated to process the first sample type may be based on a representative size of primitives defined by the graphics data. For example, when the representative size of the primitives is large, a higher ratio of threads processing pixel samples to threads processing vertex samples can result in better performance than a lower ratio of threads processing pixel samples to threads processing vertex samples. Conversely, when the representative size of the primitive small, a lower ratio of threads processing pixel samples to threads processing vertex samples can result in better performance than a higher ratio of threads processing pixel samples to threads processing vertex samples. In step 715 a number of threads are allocated for a second sample type and a maximum portion of TSR 325 allocated for threads to process samples of the second type is set. In step 720 first program instructions associated with the first sample type are executed to process graphics data and produce processed graphics data. For example, surfaces may be tessellated to produce vertices or vertices may be sampled to produce fragments. In step 725 second program instructions associated with the second sample type are executed to process the processed graphics data.

FIG. 7B is a flow diagram of an alternate exemplary embodiment of thread allocation and processing in accordance with one or more aspects of the present invention. In step 750 a number of threads to be allocated for each sample type is determined. The number of threads to be allocated may be based on a representative size of primitives defined by graphics data, a number of program instructions to process the graphics data or a number of memory accesses needed to execute the program instructions to process the graphics data. Furthermore, numbers of threads for a sample type to be allocated for portions of graphics data may be determined. In step 755 a first number of threads determined for allocation to a first sample type are allocated to the first sample type. In step 760 the number of threads determined for allocation to a second sample type are allocated to the second sample type.

In step 765 first program instructions associated with the first sample type are executed to process graphics data and produce processed graphics data. In step 770 second program instructions associated with the second sample type are executed to process at least one of the graphics data or the processed graphics data. In step 775 a third number of threads determined for allocation to a first sample type are allocated to the first sample type. The third number may be allocated prior to rendering an object within a scene, a portion of a scene, a new scene or the like. Alternatively, the third number of threads may be allocated to a third sample type.

Figure 8A:
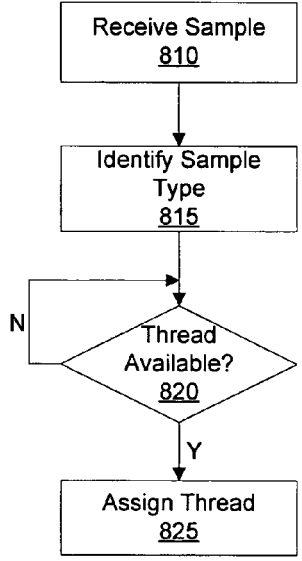
FIGS. 8A and 8B are flow diagrams of exemplary embodiments of thread assignment in accordance with one or more aspects of the present invention.

FIG. 8A is a flow diagram of an exemplary embodiment of thread assignment in accordance with one or more aspects of the present invention. In step 810 Thread Control Unit 320 or 420 receives a sample. In step 815 Thread Control Unit 320 or 420 identifies a sample type, e.g., vertex, pixel or primitive, associated with the sample received in step 810. In step 820 Thread Control Unit 320 or 420 uses thread state data, e.g., busy flag, to determine if a thread to process samples of the sample type is available, i.e., unassigned. In an alternate embodiment, Thread Control Unit 320 computes a number of available threads for each sample type using a number of threads allocated for the sample type and a number of threads assigned to the sample type. The number of threads assigned is incremented when a thread is assigned and decremented when execution of a thread is completed. If in step 820 a thread is available to process the sample, in step 825 a thread is assigned to the sample by Thread Control Unit 320 or 420. When a thread is not available in step 820, Thread Control Unit 320 or 420 does not proceed to step 825 until a thread becomes available. In step 825 the busy flag portion of the thread state data is marked unavailable and the program counter corresponding to the first instruction to process the sample is stored in the thread state data. In step 825 Thread Control Unit 320 or 420 also stores the position corresponding to the sample as part of the thread state data stored in TSR 325.

The occurrence of image artifacts caused by failing to maintain sample processing order for each output pixel position between frames or within a frame can be significantly reduced or eliminated by processing pixel type samples, e.g., pixels, fragments, and the like, for each output pixel location, in the order in which the pixel type samples are received. Processing the pixel type samples for each output pixel location in the order in which the pixel type samples are received can be achieved by permitting pixel type samples corresponding to each output pixel location to be processed by a dedicated Multithreaded Processing Unit 400 and by preventing the occurrence of position hazards. A position hazard exists when more than one pixel type sample corresponding to an output pixel position within an output buffer is being processed by any Multithreaded Processing Unit 400 because the order in which samples will be processed is not deterministic, i.e., is not necessarily the same as the order in which the samples are received.

In one embodiment each Multithreaded Processing Unit 400 is configured to process several output pixel locations distributed across an output image. In an alternate embodiment each Multithreaded Processing Unit 400 is configured to process several adjacent output pixel locations within the output image. In another embodiment each Multithreaded Processing Unit 400 is configured to process regions of four adjacent pixels arranged in a square, with each square distributed within the output image.

Thread Control Unit 320 or 420 may be configured to accept only one pixel type sample from Pixel Input Buffer 215 corresponding to each output pixel position within an output buffer and wait until the one pixel type sample is processed before accepting another pixel type sample corresponding to the same output pixel position within the output buffer. Specifically, Thread Control Unit 320 or 420 prevents processing of a subsequent thread from reading data for an output pixel position from an output buffer before a previous thread has written data to the output pixel position in the output buffer. The output pixel position is stored as a portion of thread state data in TSR 325 within Thread Control Unit 320 or 420. An output buffer ID specifying a unique output buffer containing data at output pixel positions is also optionally stored as a portion of portion of thread state data in TSR 325 within Thread Control Unit 320 or 420. A write flag may be stored as a portion of thread state data in TSR 325 indicating the thread will write data to the output pixel position. A process independent of order received (PIOR) flag is used to disable the prevention of position hazards. Disabling the PIOR flag during rendering eliminates image artifacts that can be introduced when pixel type sample processing order for each output pixel location within an output buffer is not maintained between frames or within a frame. Enabling the PIOR flag during rendering can improve performance. Furthermore, a PIOR flag may be dedicated for each sample type to selectively enable or disable PIOR for each sample type.

In an alternate embodiment each Multithreaded Processing Unit 400 is configured to process pixel type samples corresponding to any output pixel position and Pixel Input Buffer 215 can be configured to output only one pixel type sample corresponding to each output pixel position within an output buffer. In the alternate embodiment Pixel Input Buffer 215 waits until the one pixel type sample corresponding to an output pixel position within an output buffer is processed before outputting another pixel type sample corresponding to the same output pixel position within the output buffer.

Figure 8B:
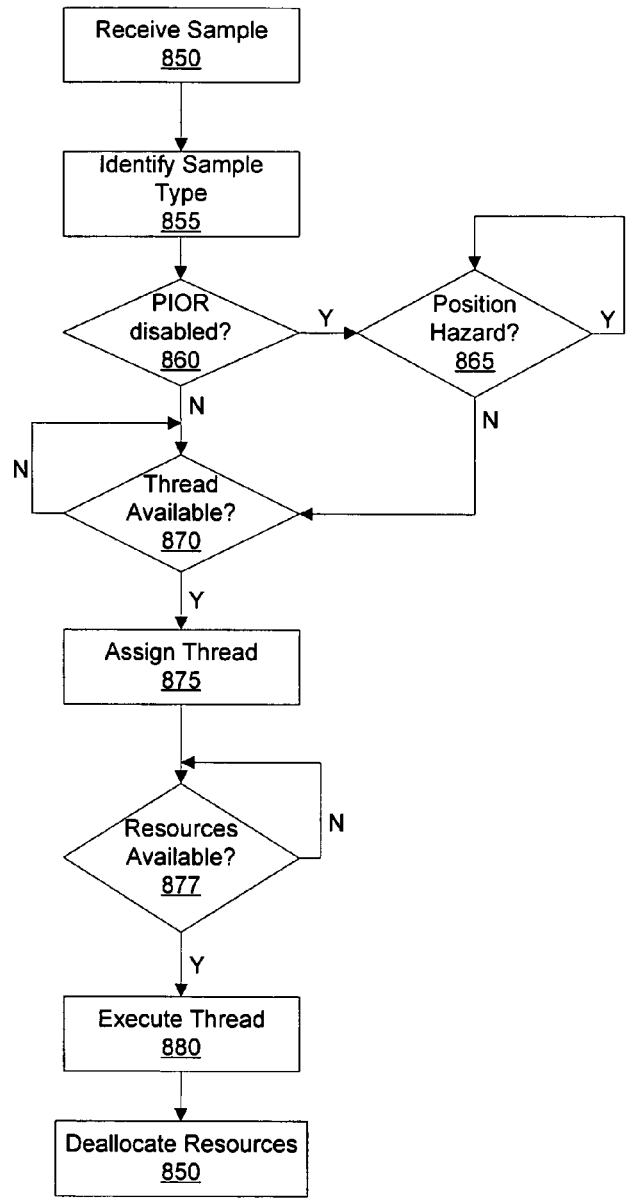

FIG. 8B is a flow diagram of an alternative exemplary embodiment of thread assignment including position hazard detection in accordance with one or more aspects of the present invention. In step 850 Thread Control Unit 320 or 420 receives a sample. In step 855 Thread Control Unit 320 or 420 identifies a sample type, e.g., vertex, pixel or primitive, associated with the sample received in step 810. In step 860 Thread Control Unit 320 or 420 determines if the PIOR flag is disabled for the sample type determined in step 855, and, if so, in step 865 Thread Control Unit 320 or 420 determines if a position hazard exists for the sample. If in step 865 Thread Control Unit 320 or 420 determines a position hazard exists for the sample, Thread Control Unit 320 or 420 remains in step 865.

A position hazard exists when an output pixel position associated with a first sample assigned to a first thread is equal to an output pixel position associated with a second sample assigned to a second thread and an output buffer ID associated with the first sample is equal to an output buffer. ID associated with the second sample. If in step 865 Thread Control Unit 320 or 420 determines a position hazard does not exist for the sample, in step 870 Thread Control Unit 320 or 420 uses thread state data stored in TSR 325 to determine if a thread is available to process a sample of the sample type, as described further herein. If in step 870 a thread is available to process the sample, in step 875 a thread is assigned to the sample by Thread Control Unit 320 or 420. When a thread is not available in step 870, Thread Control Unit 320 or 420 does not proceed to step 875 until a thread becomes available.

In step 875 the busy flag portion of the thread state data is marked unavailable and the program counter corresponding to the first instruction to process the sample is stored in the thread state data. In step 875 Thread Control Unit 320 or 420 also stores at least a portion of the output pixel position and output buffer ID associated with the sample as the thread state data. In step 877 Thread Control Unit 320 or 420 determines if storage resources for storing intermediate data generated during execution of the thread are available. The storage resources may be in graphics memory. When storage resources are not available in step 877, Thread Control Unit 320 or 420 does not proceed to step 880 until a storage resources become available.

In step 880 Thread Control Unit 320 dispatches the thread assigned to the sample and source data to at least one PCU 375. In step 850 the thread busy flag portion of the thread state data is marked as available in TSR 325 within Thread Control Unit 320 and the storage resources allocated to the thread in step 875 are effectively deallocated. Likewise, in step 880 Thread Selection Unit 415 reads the thread state data for the thread from Thread Control Unit 420 and outputs the thread state data to Instruction Cache 410. Instruction Cache 410 outputs the program instructions to Instruction Scheduler 430. Instruction Scheduler 430 determines resources for processing the program instructions are available and outputs the program instructions to Instruction Dispatcher 440. Instruction Dispatcher 440 gathers any source data specified by the instructions and dispatches the program instructions and the source data to Execution Unit 470. When Execution Unit 470 determines there are no more program instructions in the thread, in step 850 the thread busy flag portion of the thread state data is marked as available in Thread Control Unit 420 and the storage resources allocated to the thread in step 875 are effectively deallocated.

In an alternate embodiment steps 860 and 865 are completed by Instruction Scheduler 430 instead of being completed by Thread Control Unit 420. In yet another alternate embodiment steps 860 and 865 are completed by Instruction Dispatcher 440 prior to gathering source data instead of being completed by Thread Control Unit 420.

Figure 9A:
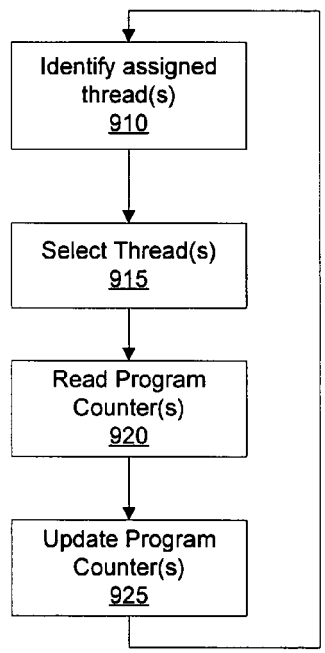
FIGS. 9A and 9B are flow diagrams of exemplary embodiments of thread selection in accordance with one or more aspects of the present invention.

Assigning a thread execution priority to each thread type to balance processing of each sample type dependent on the number of threads needed for each sample type may improve performance of multithreaded processing of graphics data. Alternatively, a thread execution priority is determined for each thread type based on the amount of sample data in Pixel Input Buffer 215 and the amount of sample data in Vertex Input Buffer 220, graphics primitive size (number of pixels or fragments included in a primitive), or a number of graphics primitives in Vertex Input Buffer 220. FIG. 9A is a flow diagram of an exemplary embodiment of thread selection in accordance with one or more aspects of the present invention. In step 910 thread state data is used to identify threads that are assigned, i.e., ready to be processed. In step 915 Thread Control Unit 320 or Thread Selection Unit 415 selects at least one thread for processing.

In step 920 Thread Control Unit 320 reads one or more program instructions, updates at least one thread pointer, schedules the one or more program instructions for execution, gathers any source data specified by the one or more program instructions, and dispatches the one or more program instructions and the source data. In step 920 Thread Selection Unit 415 reads thread state data for the at least one thread from Thread Control Unit 420. Thread Control Unit 420 updates at least one thread pointer and Thread Selection Unit 415 outputs the thread state data for the at least one thread to Instruction Cache 410. Instruction Cache 410 outputs the one or more program instructions to Instruction Scheduler 430. Instruction Scheduler 430 determines resources for processing the one or more program instructions are available and outputs the one or more program instructions to Instruction Dispatcher 440. In step 925 Thread Control Unit 320 or 420 updates the program counter stored in TSR 325 for each of the at least one thread selected for processing and returns to step 910.

Figure 9B:
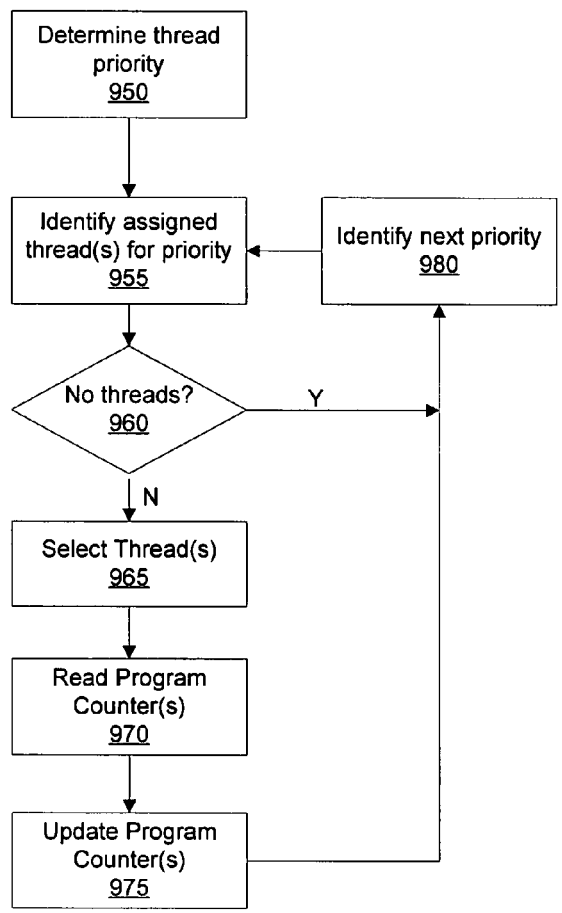

FIG. 9B is a flow diagram of an alternate exemplary embodiment of thread selection using thread execution priorities in accordance with one or more aspects of the present invention. Thread execution priority is specified for each thread type and Thread Control Unit 320 or Thread Selection Unit 415 is configured to select threads for processing based on a thread execution priority assigned to or determined for each thread type. In one embodiment a thread execution priority is determined using a global state value that is saved in a thread execution priority register. In an alternate embodiment a thread execution priority is determined based on an amount of sample data in Pixel Input Buffer 215 and another amount of sample data in Vertex Input Buffer 220 and optionally stored in the thread execution priority register. In a further alternate embodiment a thread execution priority is determined based on graphics primitive size (number of pixels or fragments included in a primitive) or a number of graphics primitives in Vertex Input Buffer 220 and optionally stored in the thread execution priority register.

In step 950 Thread Control Unit 320 or Thread Selection Unit 410 obtains a thread execution priority for each thread type, for example by reading thread execution priority data stored in the thread execution priority register. Thread Control Unit 320 or Thread Selection Unit 410 determines the priority order of the thread types, e.g., highest priority to lowest priority. In step 955 thread state data is used to identify any threads of the highest priority thread type that are assigned, i.e., ready to be processed. In step 960 Thread Control Unit 320 or Thread Selection Unit 410 determines if there are any threads of the highest priority thread type ready to be processed. If there are no threads of the highest priority thread type ready to be processed, in step 980 Thread Control Unit 320 or Thread Selection Unit 410 identifies a priority thread type, for example using a round-robin method to select the priority thread type using the priority order of the thread types determined in step 950.

In step 955 thread state data is used to identify any threads of the priority thread type that are assigned, i.e., ready to be processed. In step 960 Thread Control Unit 320 or Thread Selection Unit 410 determines if there are any threads of the priority thread type ready to be processed. In step 960 if there is at least one thread of the priority thread type, in step 965 Thread Control Unit 320 or Thread Selection Unit 410 selects at least one thread of the priority thread type for processing.

In step 970 Thread Control Unit 320 reads one or more program instructions, updates at least one thread pointer, schedules the one or more program instructions for execution, gathers any source data specified by the one or more program instructions, and dispatches the one or more program instructions and the source data. In step 970 Thread Selection Unit 410 reads thread state data for the at least one thread from Thread Control Unit 420. Thread Control Unit 420 updates at least one thread pointer and Thread Selection Unit 410 outputs the thread state data to Instruction Cache 410. Instruction Cache 410 outputs the one or more program instructions to Instruction Scheduler 430. Instruction Scheduler 430 determines resources for processing the one or more program instructions are available and outputs the one or more program instructions to Instruction Dispatcher 440. In step 975 Thread Control Unit 320 or Instruction Scheduler 430 updates the program counter stored in TSR 325 for each of the at least one thread selected for processing and proceeds to step 980.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners.
The invention claimed is:

1. A graphics processor for multithreaded execution of program instructions associated with threads to process at least two sample types comprising:
at least one multithreaded processing unit that includes a thread control unit including:
a thread storage resource configured to store thread state data for each of the threads to process the at least two sample types, wherein the at least two sample types are assigned to the threads for multithreaded processing based on an allocation priority among the at least two sample types, and wherein a number of locations in the thread storage resource allocated for each of the sample types is determined and limited by using a sample portion global state value which determines a number of each of the at least two sample types available for processing by the threads of the multithreaded processing unit.

2. The graphics processor of claim 1, wherein the sample portion global state value is a fixed value.

3. The graphics processor of claim 1, wherein the sample portion global state value is programmed.

4. The graphics processor of claim 1, wherein the sample portion global state value is determined dynamically.

5. A graphics processor for multithreaded execution of program instructions associated with threads to simultaneously process at least two sample types comprising:
a thread control unit including:
an output buffer storing data at one or more output pixel positions as a portion of thread state data;
a thread storage resource (TSR) configured to store the thread state data, the thread state data including a write flag indicating one of the threads will write data to one of the output pixel positions.

6. A graphics processor as claimed in claim 5, wherein one of the sample types is a pixel sample, the thread control unit further being configured to accept only one pixel sample corresponding to a single position within the output buffer by one of the threads, preventing a position hazard.

7. A graphics processor as claimed in claim 6, wherein the thread state data further includes a process independent of order received (PIOR) flag to prevent one of the position hazards in the output buffer.

8. A method of multithreaded processing of at least two sample types of graphics data, each thread in a multithreaded processing unit being configurable to process any of the sample types, comprising:
receiving a plurality of samples of different sample types;
determining a type of the sample;
determining how many of the threads are available for allocation among the sample types;
determining how many of the threads are assignable to each of the sample types;
assigning the samples to each of the threads for processing, and simultaneously processing at least some of the plurality of the samples.

9. The method of claim 8, further comprising:
determining that a thread is available for assignment to the sample based on a thread execution priority.

10. The method of claim 8, further comprising:
determining that a thread is available for assignment to the type of the sample based on allocation of threads among the types of the samples which is fixed or programmable.

11. The method of claim 8, further comprising:
passing a priority check based on an allocation priority for the sample type prior to assigning the sample to the thread.

12. The method of claim 8, further comprising:
receiving another sample;
determining that one of the threads is not available for assignment to the other sample; and
storing the sample while waiting for one of the threads to become available for assignment to the sample.

13. A method of multithreaded processing of at least two sample types of graphics data each thread in a multithreaded processing unit being configurable to process any of the sample types comprising:
determining that a thread is available for assignment to a sample;

determining that a sample is available to be processed by a thread;

determining the type of sample that is available; and assigning the sample that is available to the thread that is available using a thread allocation priority to identify the sample for assignment to the thread that is available.

14. The method of claim 13, further comprising:

determining that additional samples are available to be processed by threads; and simultaneously processing more than one sample of the same type in the threads.

15. The method of claim 14 further comprising associating a first set of instructions with one of the threads and a second set of instructions for another of the threads for operations on the sample assigned to the thread.

16. The method of claim 15 further comprising associating separate program counters with each of the threads to allow separate timing of execution of the first and second instruction sets.

17. The method of claim 14 further comprising associating a first set of instructions with one of the threads processing one sample type and then associating a second, different set of instructions with the same thread for the next processed sample type.

18. The method of claim 17 wherein the samples processed by successive, different instruction sets in the same thread are the same type.

19. The method of claim 13, further comprising:

determining that a thread is not available for assignment to another sample; and waiting for a thread to become available for assignment to the sample.

20. The method of claim 13 wherein the allocation of the threads to processing of the samples is based on a representative size of primitives defined by the graphics data.

* * * * *